United States Patent
Stafford

[15] 3,690,402
[45] Sept. 12, 1972

[54] VIBRATOR STABILIZATION SYSTEM
[72] Inventor: Jay H. Stafford, Ponca City, Okla.
[73] Assignee: Continental Oil Company, Ponca City, Okla.
[22] Filed: Aug. 22, 1969
[21] Appl. No.: 852,277

[52] U.S. Cl. .......................... 181/.5 VM, 181/0.5 EC
[51] Int. Cl. ............................................... G01v 1/04
[58] Field of Search .181/0.5 EC, 0.5 VM; 280/106.5

[56] References Cited
UNITED STATES PATENTS

| | | | |
|---|---|---|---|
| R25,401 | 6/1963 | Clynch | 181/0.5 |
| 2,509,803 | 5/1950 | Booth | 280/106.5 |
| 2,933,328 | 4/1960 | McIntyre et al. | 280/106.5 |
| 3,087,742 | 4/1963 | Müller et al. | 280/106.5 |
| 3,306,391 | 2/1967 | Bays | 181/0.5 |

Primary Examiner—Benjamin A. Borchelt
Assistant Examiner—N. Moskowitz
Attorney—Joseph C. Kotarski, Henry H. Huth, Jerome B. Peterson, William J. Miller, David H. Hill and Dunlap, Laney, Hessin & Dougherty

[57] ABSTRACT

Apparatus for providing stabilization of a geophysical vibrator in the horizontal plane. The apparatus is adapted for use with geophysical vibrational energy sources of the type which transmit through an energy coupling baseplate into the earth, such as a baseplate being forced into a coupling by bearing a part of the weight of a support vehicle thereupon. The apparatus provides a plurality of radius rods between the base plate and vertical support structure and extending in both the transverse and longitudinal directions to restrain movement of the support structure in the horizontal plane without noticeable interference to the vertical attitude of vibration.

9 Claims, 5 Drawing Figures

PATENTED SEP 12 1972 3,690,402

INVENTOR
JAY H. STAFFORD

BY William L. Miller
ATTORNEY

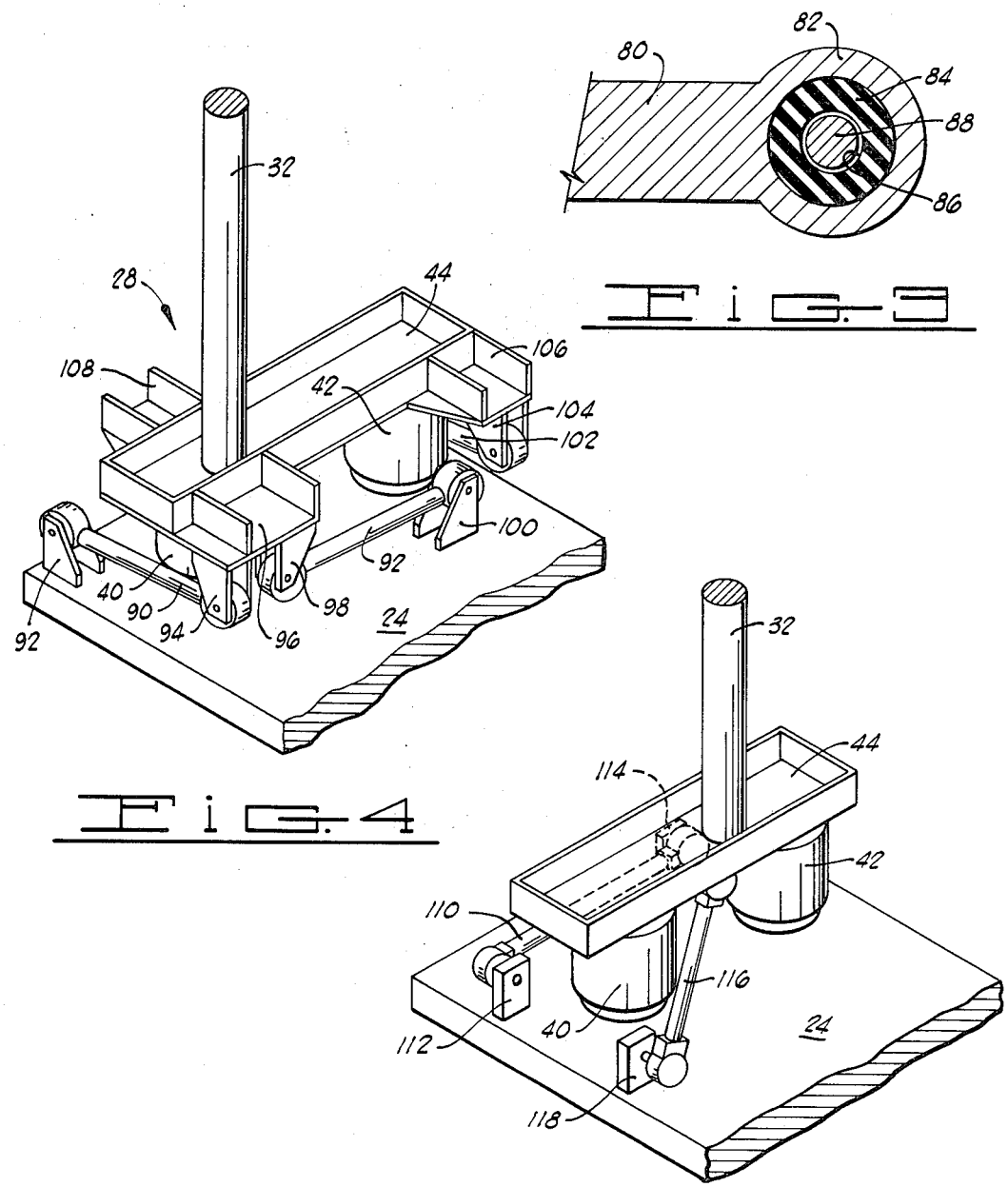

VIBRATOR STABILIZATION SYSTEM

BACKGROUND OF THE INVENTION

1. Field of the Invention

The invention relates generally to seismic energy vibrators and, more particularly, but not by way of limitation, it relates to an improved vibration apparatus including structure for restraining movement in the horizontal plane without interference to the seismic vibration output.

2. Description of the Prior Art

The prior art includes various types and configurations of seismic vibrator which are portably carried by support vehicles. Such vibrator assemblies have generally included vertical supporting structure which is adjustable relative to the vehicle frame so that the weight of the vehicle can be placed on the vibrator to ensure energy coupling to the earth's surface. Selected forms of resilient device were generally interconnected between opposite sides of the vibrator base plate and the vehicle support assemblies to enable isolation of the vehicle from vibration thereby to prevent damping effects such that maximum power input to the earth is achieved. The structures directed to restraint of movement in the horizontal plane have generally been restricted to outrigging and bracing types of addendum structure, which structure has tended to introduce, albeit reasonably acceptable, some destructive frequency effects. Still other modes of combating the lateral movement problem consisted of the use of rubber lattice mounts used in combination with suitable spring members to provide lateral support, but these structures too introduced a stiff spring rate which tended to transmit energy to the vehicle, especially at the low frequencies below 8 hertz.

SUMMARY OF THE INVENTION

The present invention contemplates a mobile seismic vibrator assembly which includes support structure for restraining horizontal movement and slippage without introducing new components of interference to the output frequency. In a more limited aspect, the invention consists of a transverse stabilizing structure which is affixed to a vibrator base plate to provide lateral stabilization to the vertical support structure through which the vibrator assembly is affixed to the support vehicle. The horizontal stabilization structure consists of such as a plurality of radius rods aligned both transversely and longitudinally, and connected generally in the horizontal plane having one end affixed to the base plate and opposite ends affixed to support structure at one or the other sides of the vibrator assembly. Such radius rods are particularly constructed with resilient bushings surrounding the fastening elements so that the connections provide additional isolation as well as compensation for small errors in alignment of individual components.

Therefore, it is an object of the present invention to provide a seismic vibrator support assembly which is restrained as to horizontal movement relative to the vibrator baseplate and yet is isolated from vibrations of the baseplate.

It is also an object of the invention to provide such a vibrator support stabilization system which is relatively simple, reliable and easily maintained.

It is still further an object of the present invention to provide an apparatus which prevents lateral movement of the baseplate relative to vertical supports, but which is capable of small interjoint variations to accommodate diverse alignment situations.

Finally, it is an object of the invention to provide a seismic vibrator support system for application in truck-mounted usage which system provides maximum stability as well as isolation from generated vibration energy.

Other objects and advantages of the invention will be evident from the following detailed description when read in conjunction with the accompanying drawings which illustrate the invention.

BRIEF DESCRIPTION OF THE DRAWINGS

FIG. 3 is a sectional view of a bushing rod end of a type which may be employed in the construction of the radius rods utilized in the present invention;

FIG. 4 is an alternative form of baseplate structure which may be utilized; and

FIG. 5 is yet another alternative form of baseplate and support structure which may be employed in the present invention.

DETAILED DESCRIPTION OF THE INVENTION

Figure 1:
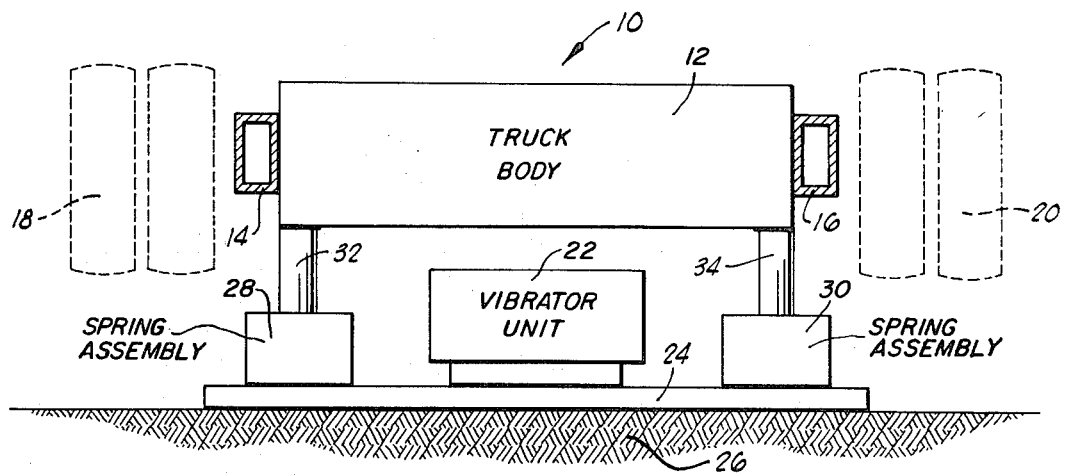
FIG. 1 is a diagrammatic view from the rear of a support vehicle as raised above a vibrator unit in contact with the earth's surface.

FIG. 1 shows a portable vibrator assembly 10, or a truck-mounted geophysical vibrator unit, in general form. Thus, a truck body, as represented generally by designator 12, is supported between opposite side frame members 14 and 16 which extend respective side wheels 18 and 20 outward therefrom.

A vibrator unit 22 is suitably affixed to a baseplate 24 in contact with earth's surface 26, and baseplate 24 is connected to suspend beneath truck body 12, preferably as affixed from side frame members 14 and 16. Thus, the baseplate 24 is resiliently affixed at opposite sides, through spring assemblies 28 and 30 and respective support rods 32 and 34, for suitable extensible connection from side frame members 14 and 16, respectively. The support rods 32 and 34 are controllable in vertical length through powered actuation, e.g. hydraulic power, to elongate and support the weight of the truck, i.e. at least a portion of such weight, over the spring assemblies 28 and 30 to maintain the baseplate 24 in firm, energy-coupling relationship to the earth's surface 26. Prior structures of this general type are taught by U.S. Pat. No. 3,353,772 entitled "Positioning and Isolation Apparatus For a Horizontal Vibrator," U.S. Pat. No. Re. 25,401 entitled "System for Anchoring and Transporting a Seismic Vibrator" and others all of which are assigned to the present assignee.

Figure 2:
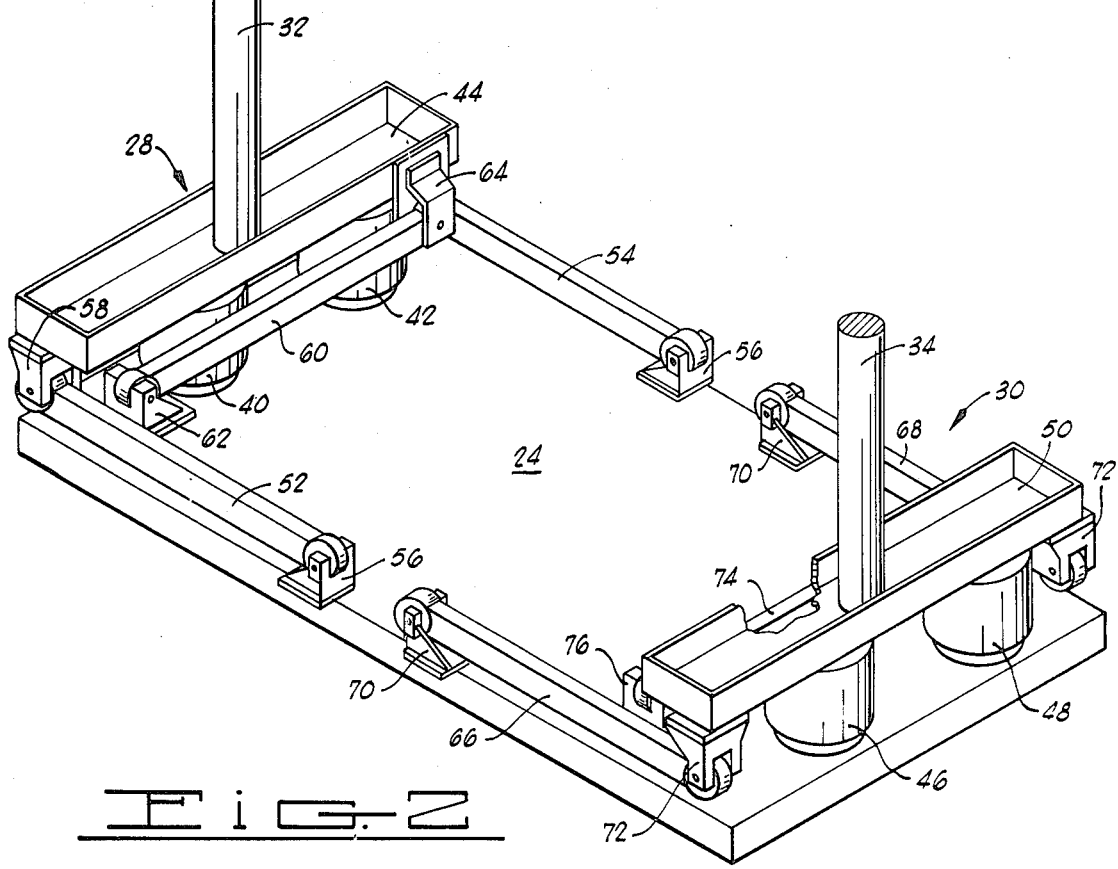
FIG. 2 is an isometric view of a vibrator baseplate constructed in accordance with the present invention.

FIG. 2 shows a generalized view of a vibrator baseplate 24 and support connections including structure for restricting or minimizing lateral motions. Thus, baseplate 24 is connected through spring assemblies 28 and 30 to the respective support rods 32 and 34 which are connected for extensible movement upward in the vehicle as shown in FIG. 1. Spring assembly 28 consists of a pair of springs 40 and 42 which are rigidly affixed at the bottom end to baseplate 24 while their upper ends are fastened to a support channel 44 which is rigidly secured to the lower end of a support rod 32. Similarly, spring assembly 30 consists of spring elements 46 and 48 as secured between the upper side of baseplate 24 and support channel 50 rigidly affixed to the lower end of support rod 34. The vertical spring assemblies may take various forms such as leaf springs, air springs, coil springs, etc., all of which serve to reduce unwanted transmission of vibrator energy, i.e. to isolate the vibrator unit from the truck during operation over a shooting site.

A network of horizontally disposed radius rods serve to provide the desirable lateral resistance to the unit while still preventing vibrations to the support vehicle at certain critical low frequencies. In effect, the function of lateral stabilization is separate from the function of isolation to allow low frequency isolation system design.

A pair of transverse radius rods 52 and 54 are connected between front and rear sides of baseplate 24, i.e. central locations, and respective front and rear ends of channel support 44. Thus, radius rods 52 and 54 are pivotally supported in respective brackets 56 at one end while the outer ends are connected to brackets 58 secured, as by welding or such, to the underside of support channel 44. Radius rods 52 and 54 restrict transverse movement of support channel 44 relative to base plate 24 while still another longitudinal radius rod 60 is connected between baseplate bracket 62 and a bracket 64 affixed on support channel 44, radius rod 60 serving to limit forward and rearward movement of support channel 44 while still allowing unhampered vertical reciprocation of spring assembly 28.

The other side of base plate 24 is similarly connected with transverse radius rods 66 and 68 having respective inward ends connected to baseplate brackets 70 while outward ends are connected to brackets 72 as fixed on opposite sides (front and rear) of support channel 50. Also, in similar manner, a longitudinal radius rod 74 extends from pivotal connection at a baseplate bracket 76 into pivotal connection with a bracket 78 as secured to support channel 50.

Each of the radius rods is formed to have an end connection structure similar to that of FIG. 3. Thus, the radius rod arm portion 80 is formed to have a loop or sleeve end portion 82 formed thereon. The sleeve end portion 82 then contains a circular lining of resilient material or cushion 84 which outlines a central pin connector bore 86 which receives a connector pin 88 therethrough. Such radius rod ends of the type including rubber bushing 84 serve to provide additional isolation as well as to provide compensation of small alignment errors in operation and placement of the system.

In operation, the support vehicle may be driven to a selected shot site whereupon the support equipment is operated to place the weight of a portion of the support vehicle over the baseplate 24 to maintain it in energy-coupling relationship to the earth's surface 26. The vibrator 22 can then be operated to generate one or more bursts of vibrator seismic energy for input to the earth. Upon completion of the designated number of shots, the support equipment is operated to raise the baseplate 24 off of the surface 26 for subsequent movement of the support vehicle to the next succeeding shot site. The baseplate 24 is then replaced in energy-coupling relationship to the earth's surface 26.

When the support vehicle is resting on support rods 32 and 34 and respective spring assemblies 28 and 30 to maintain baseplate 24 firmly against the earth's surface 26, the individual spring elements 40 and 42, and 46 and 48 provide the necessary isolation as far as vertically moving forces and harmonic generations are concerned. However, such resilient coupling cannot maintain its proper vertical alignment without some form of restraint as to horizontal sliding or movement of the support elements relative to baseplate 24. Thus, the interaction of transverse radius rods 52, 54, 66 and 68 serve to prevent sidewise relative movement while longitudinal radius rods 60 and 74 serve to prevent forward and rearward relative movement. The inclusion of such as resilient bushings 84 within the connecting ends of the various radius rods enables sufficient variation of the linkages to allow accommodating yet isolating restraining connections for forces in the horizontal plane.

An alternative form of the invention may be base plate as shown in FIG. 4, only one side of the baseplate and support structure being shown as the other side will be identical. Thus, baseplate 24 is resiliently supported through spring elements 40 and 42 as affixed to support channel 44 in firm connection to support rod 32. Restriction of movements in the horizontal plane may then be effected by a transverse radius rod 90 and a longitudinal radius rod 92 connected as shown. Thus, the transverse radius rod 90 is connected for pivotal movement at each end through a baseplate bracket 92 and a bracket 94 which is rigidly secured to support channel 44 by means of an extension plate 96 extending in the horizontal plane on the inward side of the support channel 44. The longitudinal radius rod 92 is similarly pivotally fastened as between a bracket 98, also connected beneath support extension 96, and the other end of rod 92 being fastened in a bracket 100 as secured on top of the baseplate 24.

The vibrator unit, e.g. vibrator 22 (FIG. 1), may be secured by any of various structure generally in the center of baseplate 24, various clearances and connecting capabilities being dictated by the exigencies of each situation. In addition, still more radius rods may be included to provide further restriction against horizontal movement detrimental to support and vibrator operation. Thus, a second transverse radius rod 102 may be included at the opposite end of support channel 44. Radius rod 102 may be pivotally affixed between bracket 104 and a support channel extension 106 at one end while its lower end is suitably connected (not shown) to the remaining corner of baseplate 24, i.e. similar to the mounting of bracket 92. Still further longitudinal support may be included by a longitudinal radius rod (not shown) as may be positioned for diagonal, pivotal connection between baseplate 24 and a suitable bracket fastened beneath such as a lateral support channel extension 108.

The structure of FIG. 5 shows still another alternative form of horizontal stabilizing connection for use with baseplate 24 as supported through spring elements 40 and 42 for affixure to support channel 44 and support rod 32. This support provides longitudinal stabilization through a radius rod 110 pivotally connected to a baseplate bracket 112 at one end and to a support channel hanger 114 at the other end. An additional radius rod 116 provides a generally diagonal stabilization with a component of longitudinal restraint as it is connected in generally diagonal disposition between a baseplate bracket 118 and an optimally positioned bracket (not shown) beneath support channel 44.

The operation and utility of the alternative forms of the embodiment are similar to that which was described with respect to the FIG. 2 structure. Further, it should be apparent that other advantageous forms of radius rod positioning and interconnection might be developed to combat specific support and vibrator structures and intended usages.

The foregoing discloses novel stabilization structure for use with vehicle-mounted vibrator systems. The structures enable full and effective use of the truck body as an energy-coupling mass when supported over the vibrator baseplate in bearing relationship against the earth's surface.

Changes may be made in the combination and arrangement of elements as heretofore set forth in this specification and shown in the drawings; it being understood, that changes may be made in the embodiments disclosed without departing from the spirit and scope of the invention as defined in the following claims.

What is claimed is:

1. A stabilizing system for a mobile seismic energy vibrator of the type which is carried by a support vehicle having first and second frame members, comprising:

vibrator means for producing vibrational energy of predetermined amplitude and frequency;

a vibrator baseplate having said vibrator means secured centrally thereon;

first and second support members including extensible rods having upper and lower ends, and being secured to respective first and second frame members of said support vehicle;

first and second means for adjusting the length of the respective first and second support members;

first and second resilient means affixed between opposite sides of said baseplate means and respective lower ends of each of said first and second support members for transmitting at least a portion of the weight of the vehicle on the baseplate without interfering with the operation of the vibrator means; and first and second transverse rod means each being disposed in a generally horizontal plane and each having one end secured on said baseplate in pivotal manner with respective opposite ends pivotally secured to respective lower ends of said first and second support means to resist generally horizontal forces imposed on the resilient means along the axes of the rod means without interfering with operation of the vibrator means.

2. A stabilizing system as set forth in claim 1 which is further characterized to include:

first and second longitudinal rod means each being disposed in generally horizontal plane and generally at right angles to the first and second transverse rod means, and each having one end secured on said baseplate in pivotal manner with respective opposite ends pivotally secured to respective lower ends of said first and second support means for resisting forces imposed on the resilient means in the direction of the axes of said rod means without interfering with the operation of the vibrator means.

3. A stabilizing system as set forth in claim 1 which is further characterized to include:

third and fourth transverse rod means each being disposed in a generally horizontal plane and each having one end secured on said baseplate in pivotal manner with respective opposite ends pivotally secured to respective lower ends of said first and second support means for resisting forces imposed on the resilient means in the direction of the axes of said rod means without interfering with the operation of the vibrator means, said third and fourth transverse rod means being generally parallel to and spaced from said first and second transverse rod means.

4. A stabilizing system as set forth in claim 2 which is further characterized to include:

third and fourth transverse rod means each being disposed in a generally horizontal plane and each having one end secured on said baseplate in pivotal manner with respective opposite ends pivotally secured to respective lower ends of said first and second support means for resisting forces imposed on the resilient means in the direction of the axes of said rod means without interfering with the operation of the vibrator means, said third and fourth transverse rod means being generally parallel to and spaced from said first and second transverse rod means.

5. A stabilizing system as set forth in claim 1 wherein each of said transverse rod means comprise:

a rod terminated at each end by an eye portion;

first and second resilient means each lining one of said eye portions to define a fastening bore therethrough.

6. A stabilizing system as set forth in claim 2 wherein each of said transverse and longitudinal rod means comprise:

a rod terminated at each end by an eye portion;

first and second resilient means each lining one of said eye portions to define a fastening bore therethrough.

7. A stabilizing system as set forth in claim 4 wherein each of said transverse and longitudinal rod means comprise:

a rod terminated at each end by an eye portion;

first and second resilient means each lining one of said eye portions to define a fastening bore therethrough.

8. A stabilizing system as set forth in claim 1 wherein said first and second support means comprise:

first and second bushings secured to said respective first and second frame members;

first and second support rods slidably disposed through said respective first and second bushings and oriented in the vertical direction; and first and second hydraulic cylinder means each connected between a respective frame member and support rod lower end for varying the distance of the respective lower end relative to the frame member.

9. A stabilizing system as set forth in claim 8 which is further characterized to include:

first and second longitudinal rod means each being disposed in generally horizontal plane and longitudinal orientation, and each having one end secured inwardly on said baseplate in pivotal manner with respective opposite ends pivotally secured to respective lower ends of said first and second support means for resisting forces imposed on the resilient means in the direction of the axes of said rod means without interfering with the operation of the vibrator means.

* * * * *